United States Patent [19]

Pilarski

[11] Patent Number: 4,787,756
[45] Date of Patent: Nov. 29, 1988

[54] APPARATUS AND METHOD OF SEAT ADJUSTER SLIDE

[75] Inventor: Regis V. Pilarski, Utica, Mich.

[73] Assignee: General Motors Corporation, Detroit, Mich.

[21] Appl. No.: 160,661

[22] Filed: Feb. 26, 1988

[51] Int. Cl.⁴ ............................................. F16C 29/04
[52] U.S. Cl. ..................................................... 384/47
[58] Field of Search ................ 384/47, 18, 49, 21, 384/34, 59, 17

[56] References Cited

U.S. PATENT DOCUMENTS

| | | | |
|---|---|---|---|
| 2,725,092 | 11/1955 | Cartwright | 155/14 |
| 3,685,872 | 8/1972 | Babbs | 384/47 |
| 3,850,484 | 11/1974 | Cousin | |
| 3,944,302 | 3/1976 | Fourrey | 384/47 |
| 4,511,187 | 4/1985 | Rees | 384/18 |
| 4,569,563 | 2/1986 | Fourrey | |
| 4,630,872 | 12/1986 | Teramachi | 384/45 |

Primary Examiner—Lenard A. Footland
Attorney, Agent, or Firm—Ernest E. Helms

[57] ABSTRACT

The present invention provides a vehicle seat adjuster slide assembly. The assembly includes a sheet metal formed lower rail. The lower rail includes a channel floor with spaced apart upward extending legs to form an inner bay. The legs have outward extending flanges. An upper bearing ball is nested on top of each flange. A lower bearing ball is nested on the bottom of each flange. The adjuster slide assembly also has an upper rail slidably mounted on the lower rail. The lower rail has a ceiling covering the bay and C-shaped side bellies. Each side belly surrounds the nests the upper and lower bearing balls. The ends of the bellies extend under the flanges of the upper rail. The upper rail can slide on the lower rail without contact between the side bellies and the flange except when an excessive force is placed on the upper rail causing the side belly ends to contact the flange to prevent separation of the upper rail from the lower rail.

6 Claims, 2 Drawing Sheets

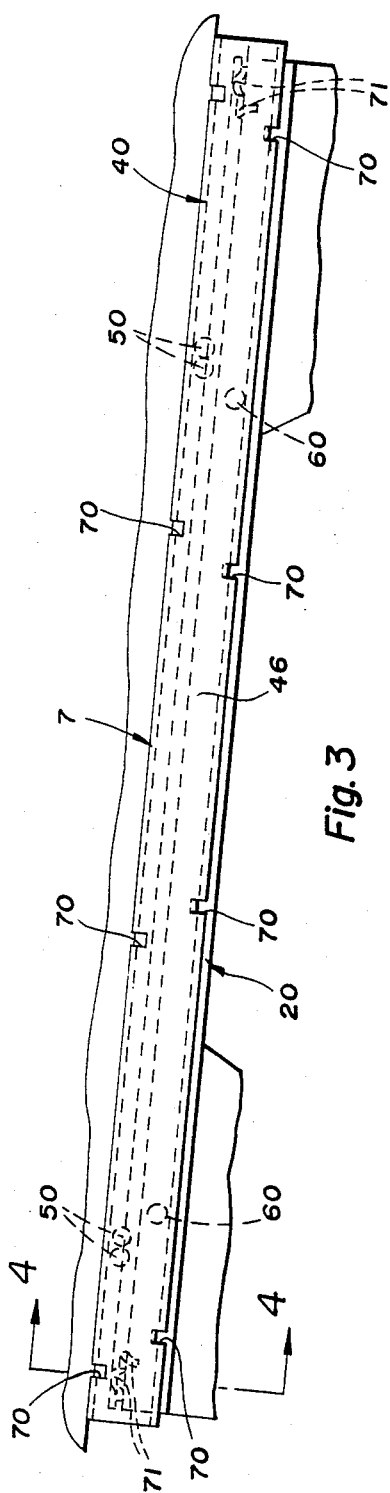
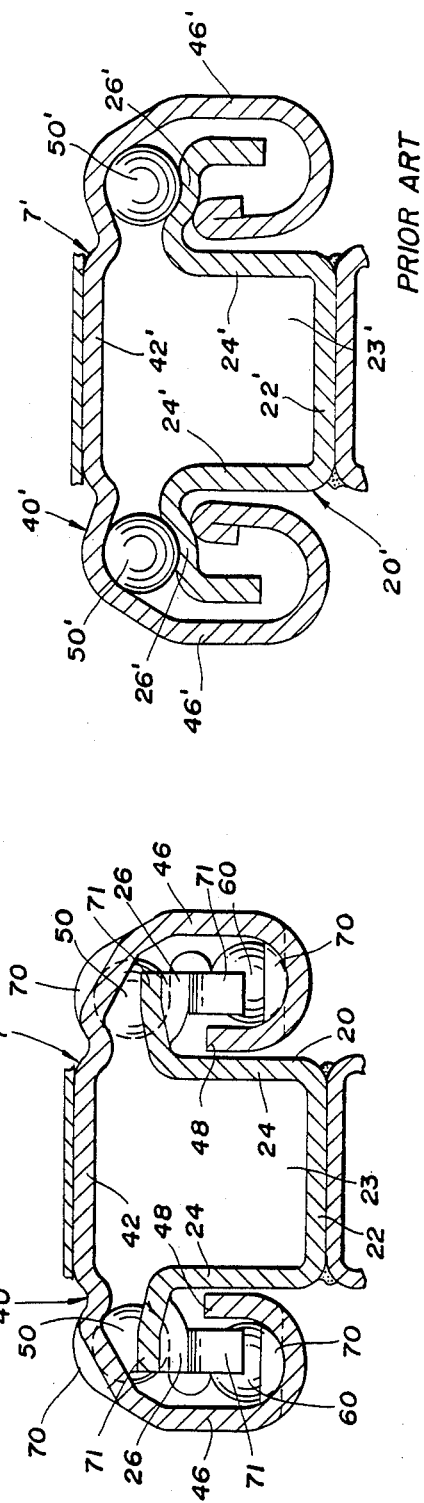

APPARATUS AND METHOD OF SEAT ADJUSTER SLIDE

FIELD OF THE INVENTION

The field of the present invention is that of automotive vehicle horizontal seat adjuster slides.

DISCLOSURE STATEMENT

It is known in the art to provide seat adjuster slides to facilitate horizontal movement of a vehicle seat in the fore and aft direction within a vehicle. A more detailed understanding of seat adjuster slides may be gained by a review of U.S. Pat. No. 4,511,187, to Ress, commonly assigned.

To prevent separation of an upper rail (sometimes referred to as a channel) from a lower rail due to an excessive loading on the upper rail, an edge of the upper rail can be interlocked- under a flanged projection of the lower rail. It is known to capture a ball bearing between the upper rail and the flange projection of the lower rail and then to extend the edges of the upper rail underneath the flange end of the lower channel to provide the interlock.

To assure proper operation, the upper rail must slide on the lower rail as freely as possible. At the same time the upper rail must be securely fitted to the lower rail in horizontal direction transverse to the direction of sliding movement. The upper rail must also be securely fitted to the lower rail in the vertical direction.

To vertically stabilize the connection between the upper and lower rail, cylindrical rollers are placed between the upper and lower roller to define the vertical spacing between the upper and lower rails. The roller will contact a generally flat area on the upper rail. However, the above creates an undersirable condition since a fastener cannot be used which projects into spacing between the upper and lower rail since the fastener would interfere with the roller.

To eliminate the roller so as to allow utilization of the spacing between the upper and lower rails a prior slide assembly had the cross-sectional ends of the upper rail curled underneath the flanged ends of the lower rail (FIG. 5). The cross-sectional ends of the upper rail were brought into contact with the flanged ends of the lower rail to place the bearing balls in an interference relationship between the upper and lower rails thereby providing both lateral and vertical stability. When the seat is adjusted, the contact of the rails must provide a sliding line of contact with one another.

A problem with the above noted design (FIG. 5) is that the shape of the rail is critical and is sometimes difficult to keep it within tolerance along the length of the elongated rail. Also, when a vehicle seat is pushed along its seat back, a moment force is placed on the adjuster slide assembly. A forward push from behind the seat back will impart a moment force to the rails urging separation of the upper rail from the lower rail at the rearward end of the rails. The push of the seat back will also cause the rear end of the upper and lower rails to exhibit a tendency to freeze rather than to slide freely. Also if the paint covering of the rails becomes damaged or removed, the rails will exhibit a tendency to freeze together. Freezing can also be caused by a lack of lubricant.

SUMMARY OF THE INVENTION

To overcome the above noted problems, the present invention is brought forth. The present invention provides a seat adjuster slide assembly with a lower rail with a channel floor. Extending from the channel floor forming a bay are two legs, each leg having connected thereto an extending flange. Above and below the extended flanges are bearing balls. An upward channel extends over the bay of the lower channel and captures the bearing balls of the lower channel. With the present invention, there is rolling contact regardless of any moment forces which can be placed on the rails when the seat back is pushed.

It is an object of the present invention to provide a sheet metal fabricated seat adjuster slide assembly having an open bay area in the middle and a lower rail with extended flanges having bearing balls on the upper and lower sides thereof.

It is another object of the present invention to provide a vehicle seat adjuster slide assembly, the assembly including a sheet metal formed lower rail for connection to the vehicle, the lower rail including a channel floor, spaced apart generally upward extending legs forming a bay with the channel floor, and projecting flanges extending generally transversly from the legs away from the bay, at least one bearing ball nested on the top of each of the flanges laterally spaced of the bay, at least one bearing ball nested on the bottom of each of the flanges laterally spaced of the bay, and an upper rail for connection to the seat, the upper rail including a ceiling section covering the bay, generally C-shaped slide bellies laterally spaced from one another and joined to the ceiling, each side belly surrounding and nesting the upper and lower bearing balls, and the ends of the bellies extending under the flanges of the upper rail whereby said upper rail can slide on the lower rail without contact between the side bellies and the flanges except when an excessive force is placed on the upper rail causing the side belly ends to contact the flanges to prevent separation of the upper rail from the lower rail.

It is another object of the present invention to provide a vehicle seat adjuster slide assembly, including a sheet metal formed lower rail for connection with the vehicle, the lower rail including, a channel floor, spaced apart generally upward extending legs forming a bay with the channel floor, projecting flanges extending from and generally transverse to the legs away from the bay and having an outward portion inclined downwardly and away from the bay and having a portion bent over into a double thickness, at least two upper bearing balls nested on top of each of the flanges in contact with the inclined outward portion, at least two lower bearing balls nested on the bottom of the bent over portion of each of the flanges, and an upper rail formed of sheet metal for connection to the seat, the upper rail including, a ceiling section covering the bay, and generally C-shaped side bellies laterally spaced from one another and joined to said ceiling, each side belly surrounding and nesting in an interference fit the upper and lower bearing balls, and the end of the bellies extending under the flanges of the lower rail whereby the upper rail can slide on the lower rail without contact between the side bellies and the flanges except when an excessive vertical force is placed on the upper rail causing the side belly ends to contact the flanges to prevent separation of the upper rail from the lower rail.

It is still yet another object of the present invention to provide a vehicle seat adjuster slide assembly including a sheet metal formed lower rail for connection with the vehicle, the lower rail including, a channel floor, spaced apart generally upward extending legs forming a bay with the channel floor, projecting flanges extending from and generally transverse to the legs away from the bay and having an outward portion inclined downwardly and away from the bay and having a portion bent over into a double thickness, at least two upper bearing balls nested on top of each of the flanges in contact with the inclined outward portion, at least two lower bearing balls spaced laterally outward from the upper bearing balls nested on the bottom of the bent over portion of each of the flanges, and an upper rail formed of sheet metal for connection to the seat, the upper rail including, a ceiling section covering the bay, and generally C-shaped side bellies laterally spaced from one another and joined to the ceiling, each side belly surrounding and nesting and holding in an interference fit the upper and lower bearing balls, and the end of the bellies extending under the flanges of the lower rail to point inboard of the flange bent over portion whereby the upper rail can slide on the lower rail without contact between the side bellies and the flanges except when an excessive vertical force is placed on the upper rail causing the side belly ends to contact the flanges to prevent separation of the upper rail from the lower rail.

Other objects, desires and advantages of the present invention can become more apparent to those skilled in the art as the nature of the invention is better understood in the accompanying drawings and a detailed description.

BRIEF DESCRIPTION OF THE DRAWINGS

FIG. 3 is a side elevation view of a seat adjuster slide assembly illustrated in FIG. 1;

FIG. 4 is a view taken along line 4—4 of FIG. 3; and,

FIG. 5 is a view similar to FIG. 2 of a prior art adjuster slide assembly with similar parts prime numbered.

DETAILED DESCRIPTION OF THE DRAWINGS

Figure 1:
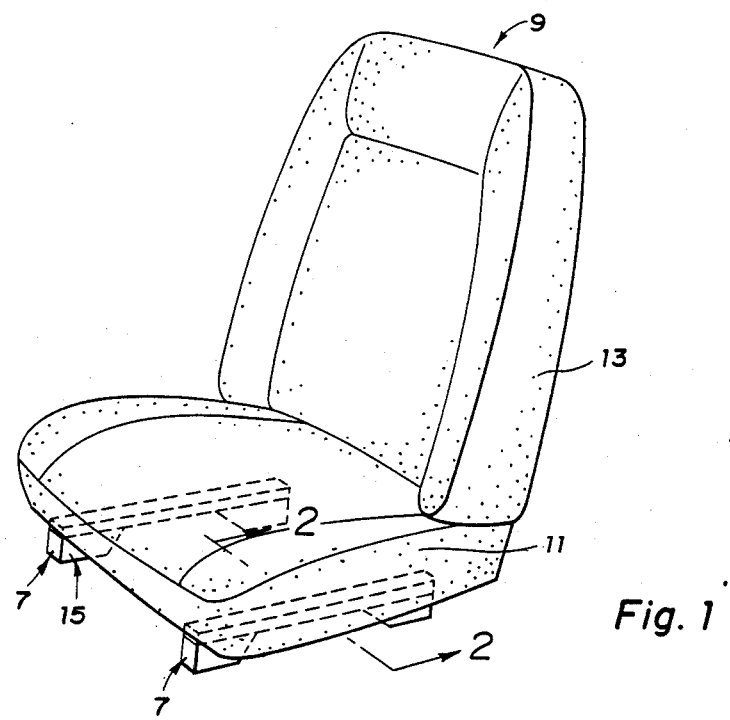
FIG. 1 is a perspective view of a vehicle seat positioned on a seat adjuster utilizing an adjuster slide assembly according to the present invention.

Referring to FIG. 1, the vehicle seat 9 has a seat cushion 11 which has a fixedly or pivotally joined vehicle seat back 13. The vehicle seat 9 is mounted adjustably fore and aft into the vehicle (not shown) on seat adjuster 15. The seat adjuster 15 typically has two parallel mounted seat adjuster slide assemblies 7. In the case of a tri-mount seat adjuster (not shown) there will usually be one central seat adjuster slide.

Figure 2:
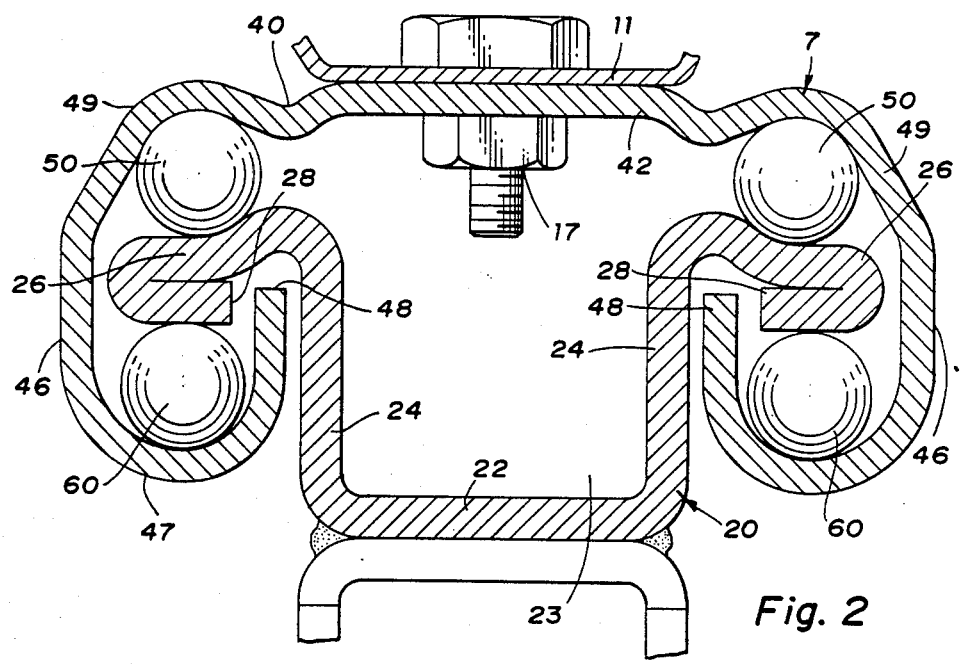
FIG. 2 is a view taken along line 2—2 of FIG. 1.

Referring additionally to FIGS. 2 through 4, the seat adjuster slide has a lower rail 20 which is fixedly connected to the vehicle floor. The lower rail 20 is formed from rolled, pull through die formed extruded, or stamped heavy gauged sheet metal. Towards the bottom of the lower rail 20 is the channel floor 22. Spaced apart from the channel floor 22 and extending generally upwards are two legs 24. The channel floor 22 and the legs 24 cooperate to form a bay 23 within the lower rail 20. The lower rail 20 has two outwardly projecting flanges 26 slightly downwardly inclined. The flanges 26 are generally transverse to the legs 24. The flanges 24 also bend over into a portion of a double thickness with an end 28.

Nested on top of each of the flanges is an upper bearing ball 50. Typically there will be provided in each adjuster assembly 7 eight upper bearing balls 50, four on each flange 26. Nested underneath the flanges 26 is at least one lower bearing ball 60. Typically there is provided two lower bearing balls 60 underneath each separate flange 26. The lower bearing balls 60 are slightly outboard of the upper bearing balls 50. The upper 50 and lower 60 bearing balls are confined in the length of the adjuster slide assembly channel by a series of slotted projections 70 and 71 which are stamped out of the upper 40 and lower 20 rails to trap the bearing balls. The slotted projections 71 also serve as end stops to prevent the upper rail 40 from disengaging from the lower rail 20 in the longitudinal direction.

Connected with the seat cushion 11 via a bolt and nut fastener 17 is an upper rail 40. The upper rail 40 has a ceiling 42 or covering over the bay 23. Joined to the ceiling 42 on both sides thereof are generally C-shaped side bellies 46 laterally spaced from one another. Each side belly 46 surrounds and nests the upper 50 and lower 60 bearing balls, and an end 48 of the side belly extends underneath the flange 26 of the lower rail 20. The side bellies 46 are formed in such a way to maintain the upper 50 and lower 40 bearing balls in an interference compression fit. Contact between the upper rail 40 and lower rail 20 is prevented except when the upper rail 40 is acted upon by an excessive vertical force causing the side belly ends 48 to contact the flanges 26 of the lower rail 20.

The inclination of the flanges 26 in cooperation with an upper portion 49 of the side bellies trap the upper bearing balls 50 to give the seat adjuster slide assembly 7 stability in the lateral direction. Movement of the top rail 40 to the right causes the upper bearing ball 50 on the left side flange 26 of the adjuster slide assembly 7 to ride up the incline of flange 26. The aforementioned upper bearing ball 50 is prevented from doing so by the fit of the upper bearing ball between the flange 26 and the upper portion of the side belly 49. In like manner, lateral movement to the left side is stabilized on the right side of the seat adjuster slide assembly 7. In the vertical direction, movement down is prevented by the upper bearing ball 50 being forced down against the flange 26. Movement in an upward direction is prevented by lower bearing ball 60 contact with flange 26.

As mentioned previously prior to the present invention, to stabilize the upper rail 40' in a vertical direction, the ends of the upper rail 40' were in sliding contact with the lower rail flange 26'. When the seat was pushed along the seat back, a moment force was generated causing the adjuster slide assemblies to exhibit a tendency to freeze due to the moment force. With the present invention, potential freezing is alleviated by the presence of the lower bearing ball 60 underneath the flange 26. The bending of the lower section 47 of the top rail is not nearly as critical since it only needs to provide a nesting for the lower bearing balls 60.

Since there is no central roller, the movement of the upper rail 40 on the lower rail 20 will not be constrained by obstructions within the bay 23 contacting a central roller. Therefore the bay 23 may be freely utilized for fasteners 17 which would connect the top rail 40 to the vehicle seat cushion 11 or the bottom channel 22 to the vehicle floor (not shown).

The adjuster assembly slide assembly 7 is also advantageous in that the force required for vertical upward separation of the upper rail 40 from the lower rail 40 is increased over the separation force required by the prior seat adjuster slide assembly 7'. Upon experiencing an excessive vertical force upon the upper rail 20 the ends 48 of the side bellies will come into contact with the flanges 26. Any further movement upwards from this point will require elastic deformation of flanges 26 upward. The upward force will be distributed between the contact of the lower bearing balls 60 with flanges 26 and the side belly ends 48 with flanges 26. The distribution of vertical force between the side belly ends 48 and bearing balls 60 with flanges 26 tends to increase the force necessary for separation of the upper 40 and lower 20 rails. Also the bent over portion of flanges 26 serves as deterrent to separation due to a greater resistance to deformation.

While an embodiment of the present invention has been explained it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat adjuster slide assembly, said assembly in combination comprising:
    a sheet metal formed lower rail for connection to said vehicle, said lower rail including;
    a channel floor;
    spaced apart generally upward extending legs forming a bay with said channel floor; and
    projecting flanges extending generally transversely from said legs away from said bay;
    at least one bearing ball nested on the top of each of said flanges laterally spaced of said bay;
    at least one bearing ball nested on the bottom of each of said flanges laterally spaced of said bay; and
    an upper rail for connection to said seat, said upper rail including;
    a ceiling section covering said bay; generally C-shaped side bellies laterally spaced from one another and joined to said ceiling, each said side belly surrounding and nesting said upper and lower bearing balls and, the ends of said bellies extending under said flanges of said upper rail whereby said upper rail can slide on said lower rail without contact between said side bellies and said flanges except when an excessive force is placed on said upper rail causing said side belly ends to contact said flanges to prevent separation of said upper rail from said lower rail.

2. A seat adjuster slide assembly as described in claim 1 wherein said upper and lower bearing balls are held within an interference fit between said side bellies and said lower rail flange.

3. A seat adjuster slide assembly as described in claim 1 wherein said flange of said lower rail includes a section bent over into a double thickness.

4. A seat adjuster slide assembly as described in claim 1 wherein each said flange has at least two upper and two lower bearing balls.

5. A vehicle seat adjuster slide assembly, said assembly in combination comprising:
    a sheet metal formed lower rail for connection with said vehicle, said lower rail including;
    a channel floor;
    spaced apart generally upward extending legs forming a bay with said channel floor;
    projecting flanges extending from and generally transverse to said legs away from said bay and having an outward portion inclined downwardly and away from said bay and having a portion bent over into a double thickness;
    at least two upper bearing balls nested on top of each of said flanges in contact with said inclined outward portion;
    at least two lower bearing balls nested on the bottom of said bent over portion of each of said flanges; and
    an upper rail formed of sheet metal for connection to said seat, said upper rail including;
    a ceiling section covering said bay; and
    generally C-shaped side bellies laterally spaced from one another and joined to said ceiling, each said side belly surrounding and nesting in an interference fit said upper and lower bearing balls, and the end of said bellies extending under said flanges of said lower rail whereby said upper rail can slide on said lower rail without contact between said side bellies and said flanges except when an excessive vertical force is placed on said upper rail causing said side belly ends to contact said flanges to prevent separation of said upper rail from said lower rail.

6. A vehicle seat adjuster slide assembly, said assembly in combination comprising:
    a sheet metal formed lower rail for connection with said vehicle, said lower rail including:
    a channel floor;
    spaced apart generally upward extending legs forming a bay with said channel floor;
    projecting flanges extending from and generally transverse to said legs away from said bay and having an outward portion inclined downwardly and away from said bay and having a portion bent over into a double thickness;
    at least two upper bearing balls nested on top of each of said flanges in contact with said inclined outward portion;
    at least two lower bearing balls spaced laterally outward from said upper bearing balls nested on the bottom of said bent over portion of each of said flanges; and
    an upper rail formed of sheet metal for connection to said seat, said upper rail including;
    a ceiling section covering said bay; and
    generally C-shaped side bellies laterally spaced from one another and joined to said ceiling, each said side belly surrounding and nesting in an interference fit said upper and lower bearing balls, and the end of said bellies extending under said flanges of said lower rail to point inboard of said flange bent over portion whereby said upper rail can slide on said lower rail without contact between said side bellies and said flanges except when an excessive vertical force is placed on said upper rail causing said side belly ends to contact said flanges to prevent separation of said upper rail from said lower rail.

* * * * *